Patented Nov. 7, 1939

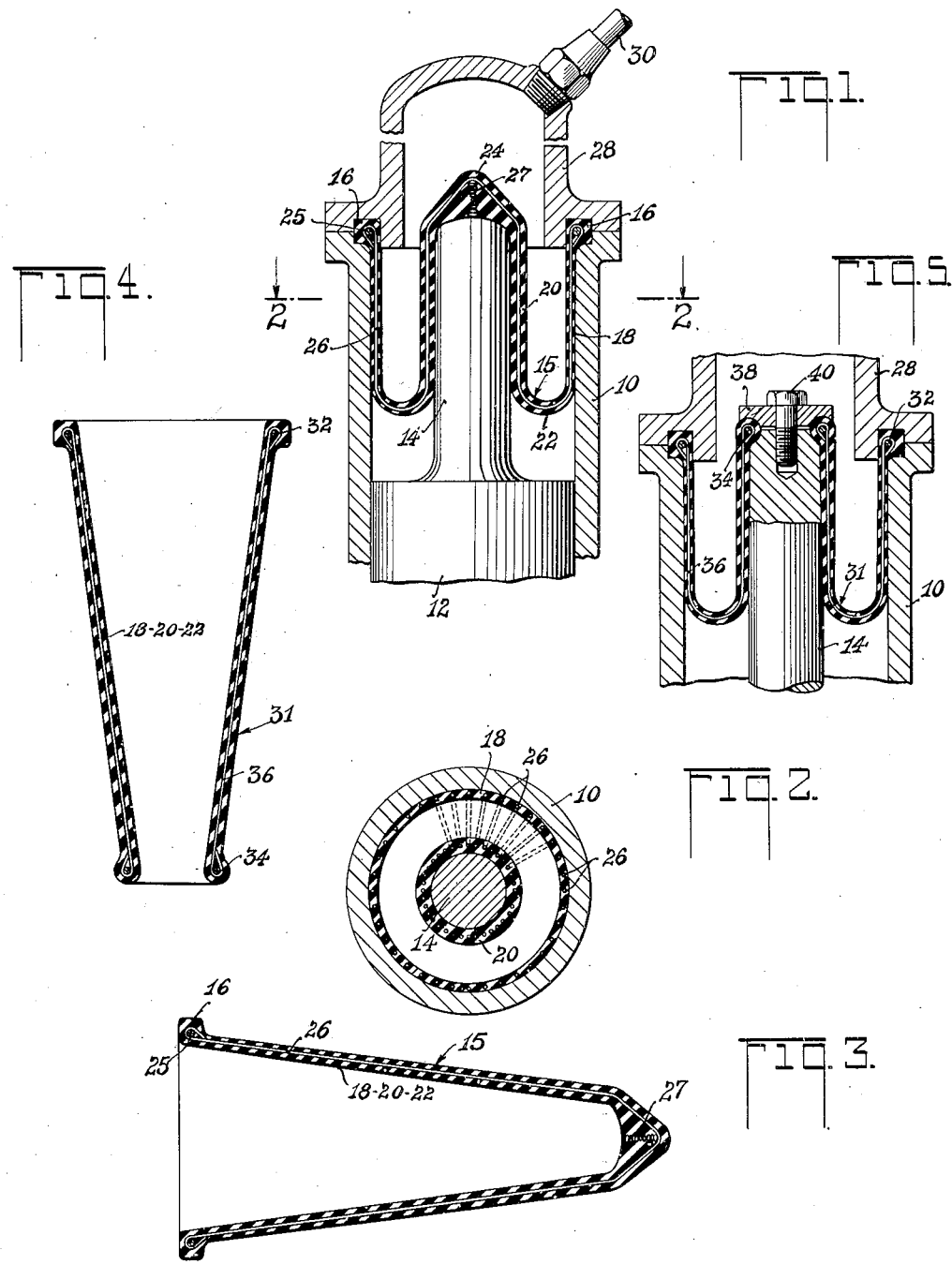

2,178,953

UNITED STATES PATENT OFFICE 2,178,953

HYDRAULIC PLUNGER SEAL

Roland Chilton, Ridgewood, N. J., assignor to Wright Aeronautical Corporation, a corporation of New York Application October 16, 1937, Serial No. 169,350

4 Claims. (Cl. 137—157)

This invention relates to fluid pressure seals between reciprocating parts, and prime objects of the invention are to provide a pressure seal of greater pressure capacity, and a seal wherein all sliding surfaces subject to leakage are eliminated.

"Stocking" or rolling type seals are known in the art and comprise a flexible sleeve, usually of rubber, having inner and outer cylindrical parts so that the inner part may move relatively to the outer part by a rolling action, whereby material is paid off around the joining element from the inner to the outer parts in one direction of movement and vice versa in the other, as in the process of turning a "stocking" inside out.

The prime feature of the present invention consists in a special method of reinforcing the seal member by flexible cords having a novel disposition whereby elastic stretch of the rubber element under fluid pressure is prevented without in any way impairing the ability of the flexible material to roll in operation to transfer itself from the inner and outer circumferences.

Other objects will be obvious from, or will be pointed out in the following description, with reference to the drawing, in which:

Fig. 1 is an axial section of a cylinder-plunger incorporating a seal;

Fig. 2 is a transverse section on the line 2—2 of Fig. 1;

Fig. 3 is a development of the seal alone;

Fig. 4 is a development of an alternative seal, and

Fig. 5 is an axial section through a cylinder-plunger incorporating the seal of Fig. 4.

In the drawing, 10 designates a cylinder element in which is slidably fitted a plunger 12 having a projecting head 14 of reduced diameter. A flexible seal 15 between the cylinder 10 and the head 14 comprises a bead 16, an outer tubular portion 18 and an inner tubular portion 20, joined by the rolled portion 22, a head portion 24 completing the seal and overlapping the head 14. The seal 15 comprises a flexible diaphragm bridging the head 14 and the cylinder 10 and allowing movement therebetween.

Reinforcing cords 26 extend from the bead 16 through the wall portions 18—20—22 across the head 24 down the diametrically opposite wall portions back up to the bead 16. Within this bead the cords may be wrapped around a form ring 25 and the entire reinforcement may be laid up from a single length of cord 26, the individual cord runs crossing over each other within the thickened head 24 as shown at 27. The cord structure is then imbedded in rubber by vulcanization to comprise the integral sealing unit.

It is an important provision of the invention that the cords in the walls run longitudinally of the seal 15 only. It will be seen that should the plunger be moved upwardly, for example, material is paid off from the cylinder 10 on to the smaller diameter plunger 14 wherein the cords are accordingly closer spaced than in the outer portion 18 as is clear from Fig. 2 and for the same reason the thickness of rubber on the inner portion 20 is greater than in the outer portion 18 in proportion to the different circumferences. It will be seen that the longitudinal cords in no way stiffen the structure against these changes in circumference and thickness as would any woven fabric or other reinforcements having circumferential elements. The bead 16 is clamped at assembly by a suitable cover 28 having a pressure connection 30.

It will be seen that when fluid pressure is applied beneath the cover 28, the load is taken in tension by the cords 26 which, being substantially non-stretchable as compared with the rubber, give the entire structure volumetric rigidity and permit high pressures to be carried despite the fact that the rubber itself is highly elastic and extensible. In other words, the rubber affords complete fluid tightness while the cords carry the operating loads.

In the drawing, the spacing of the cords has been exaggerated. In practice, they will be so spaced as to be close together when on the contracted portion 20. If, for example 100 strands of cord like that which appears in Fig. 1 be used, the operating load will be distributed over 200 working portions of the cords. In this way, a structure capable of carrying very high pressures is afforded. At the same time, a non-porous elastic material and a tight clamp on the bead 16 is all that is needed to insure zero leakage which cannot be affected by operating movement of the plunger and is quite independent of the plunger fit.

The natural curvature assumed by the seals 15 and 31 due to their distortion from large to small diameter conforms to the shape which they will assume under fluid pressure which again contributes to the objective of volumetric rigidity in the assembled device. If desired, the vulcanizing dies may take the form appropriate to Figs. 3 and 4 wherein the wall elements are molded as a straight taper extending from the head to the bead, the sleeve so formed being turned partly "inside out" before assembly. This particular method will involve the bead section rotating 180° relative to the end ring if this be made of wire or other rigid material, in which case it may be desirable to coat the metallic rings 25, 32 or 34 with some substance inhibiting adhesion of the cord and rubber thereto.

Figs. 4 and 5 show an alternative embodiment wherein a sealing sleeve 31 is provided with end rings 32 and 34 over which a cord 36 is reeved, the whole sleeve being impregnated with rubber, as shown. The large sleeve end is held between the housing 10 and the cover 28, while the small sleeve end is drawn inwardly within the larger sleeve end, the smaller end being clamped to the end of the plunger 14 by a cap 38 and a screw 40.

The two arrangements operate in the same manner, the sleeves being different only at that end which is engaged by the end of the plunger 14.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A non-stretchable seal for piston and cylinder members comprising a flexible U section annulus contacting respective members, a closing head integral with the inner limb of the U and a bead integral with the outer limb of the U and cords extending through said seal between diametrically opposed points on said bead, said cords lying radially in said head and in the curved part of the seal between said limbs and lying longitudinally in said limbs.

2. As an article of manufacture, a tapered rubber sleeve closed at its smaller end, a ring at the larger end, and cords, imbedded in the rubber, reeved from said ring longitudinally along one side of the sleeve, radially across the closed end and in overlapping relation with prior and successive runs of the cord, and longitudinally along the diametrically opposite side of the sleeve to said ring.

3. A diaphragm for sealing a plunger relative to a cylinder comprising a rubber conical frustum having a ring at its larger end, the frustum being integrally closed at its smaller end by rubber; and a single re-enforcing cord reeved from said ring along a conical element, across the closed small end and back to the ring along a conical element substantially diametrically opposed to the first said element, around said ring and similarly back and forth along conical elements; so that cord runs lie adjacent to one another throughout the periphery of the frustum, said cord runs lying one over the other at the closed end of the diaphragm, said cord, including all the runs thereof, being embedded in the rubber of the diaphragm.

4. As an article of manufacture, a diaphragm comprising a conical frustum of rubber closed by the rubber at its smaller end, a metallic ring embedded in the rubber at its larger end; and a reinforcing cord, embedded throughout in the rubber, reeved back and forth, around the ring, along a conical element of the frustum, radially across the closed end, along a conical element substantially diametrically opposite to the first and around the ring; the successive cord runs in the aggregate forming longitudinally extending reinforcements, throughout the periphery of the frustum, between the ring and the closed end.

ROLAND CHILTON.